United States Patent
Gile et al.

(10) Patent No.: US 7,941,415 B2
(45) Date of Patent: May 10, 2011

(54) METHOD OF EDITING RECIPIENT HEADER FIELDS BASED ON EMAIL CONTENT

(75) Inventors: Kimilee S. Gile, Leominster, MA (US); Elaine I. Kuo, Chelmsford, MA (US); Fang Lu, Billerica, MA (US); Corey S. McCaffrey, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 12/140,453

(22) Filed: Jun. 17, 2008

(65) Prior Publication Data
US 2009/0313240 A1 Dec. 17, 2009

(51) Int. Cl.
G06F 7/00 (2006.01)
G06F 17/30 (2006.01)
G06F 15/16 (2006.01)

(52) U.S. Cl. ......... 707/705; 707/769; 707/803; 709/206
(58) Field of Classification Search .................. 707/705, 707/769, 803, 999.003; 709/206
See application file for complete search history.

(56) References Cited

U.S. PATENT DOCUMENTS

| 7,117,210 | B2 * | 10/2006 | DeSalvo | 707/999.2 |
| 7,734,670 | B2 * | 6/2010 | Poozhiyil et al. | 707/759 |
| 2004/0103155 | A1 | 5/2004 | Perepa et al. | |
| 2006/0068755 | A1 * | 3/2006 | Shraim et al. | 455/410 |
| 2008/0010350 | A1 * | 1/2008 | Chen et al. | 709/206 |

* cited by examiner

Primary Examiner — Vincent Boccio
(74) Attorney, Agent, or Firm — Cantor Colburn LLP; Ayla Lari

(57) ABSTRACT

A method is provided for flagging email messages sent to a user containing inquiries directed to the user comprises defining a natural language model for a set of inquiring phrasal forms in a first data store; defining a list of terms used to identify a first user having an email address managed by a host system in a second data store; accessing the host system to retrieve an email message sent to the email address; parsing a textual content of a body of the email message to generate one or more natural language tokens each corresponding to a text string in the body; accessing the first data store to identify each of the one or more natural language tokens that matches with an inquiring phrasal form; accessing the second data store to determine if any of the text strings corresponding to the one or more natural language tokens that match with an inquiring phrasal form includes a term from the list of terms; and flagging the email message if any of the text strings in the message body corresponding to the one or more natural language tokens that match with an inquiring phrasal form includes a term from the list of terms.

4 Claims, 4 Drawing Sheets

METHOD OF EDITING RECIPIENT HEADER FIELDS BASED ON EMAIL CONTENT

BACKGROUND OF THE INVENTION

1. Field of the Invention

Exemplary embodiments of the present invention relate to electronic messaging, and more particularly, to processing of incoming electronic mail messages.

2. Description of Background

In computer communication networks, one method of communication is electronic mail (email), in which a sending user prepares and sends a message over some form of computer network to a receiving user, usually on a remote system. Most email clients, which are front-end computer programs that are used to read, write, and send email messages, also provide software to facilitate reading, saving, printing and replying to email messages. Because email messages can be sent at any time across the world as easily as across the office, to a group of people or a single recipient, without the user leaving his or her desk, email can provide considerable benefits over traditional paper based memos and postal systems. Until recently, the use of electronic mail was the single biggest generator of traffic volume on the Internet.

Currently, the industry standard specifying a syntax for email text messages that are sent between computer users is "Request for Comments 2822" (RFC 2822), published by the Internet Society in April 2001 (and available on the Internet at http://www.ietf.org/rfc/rfc2822.txt). This document is herein incorporated by reference. As outlined in Section 2 of RFC 2822, a standard email message consists of lines of ASCII test and is structured to begin with a set of message header fields (or header lines) that is followed by a message body, which contains the message author's content. Some header fields are mandatory and others are optional. The message body comprises a value string that is simply a sequence of characters that follows the header fields and is separated from the header fields by an empty line (that is, a line with nothing preceding the Carriage Return Line Feed, or CRLF)

The header fields have a fixed format that includes a keyword name immediately after newline that is followed by a colon character (":"), a space, and a field value, which consists of a string of bytes in the field after the colon that is continued on non-null subsequent lines. The usual header fields for an email message include at least the 'From:' field, which provides the email address of the message's sender and optionally the name of the sender; the 'To:' field, which the provides the email address(es) of the message's recipient(s) and optionally the name(s) of the recipient(s); the 'Subject:' field, which can provide a brief summary or indicate the nature of the message's contents; and the 'Date:' field, which provides the local time and date when the message was written. The message body follows the headers and is separated from them by a blank line.

Email addresses occur in several originator and destination address header fields to indicate senders and recipients of messages. An address may either be an individual mailbox or, when it is desirable to treat several mailboxes as a single unit (that is, in a distribution list), a group of mailboxes. A mailbox is a conceptually entity that receives mail. Normally, a mailbox is comprised of two parts: (1) an optional display name that indicates the name of the recipient (which could be a person or a system) that could be displayed to the user of an email client application, and (2) an address specification enclosed in angle brackets ("<" and ">"). An address specification is a specific Internet identifier that contains a locally interpreted string followed by the at-sign character ("@", ASCII value 64) followed by an Internet domain. The domain portion identifies the point to which email messages are delivered. The local-part portion is a domain dependent string. In addresses, it is simply interpreted on the particular host as a name of a particular mailbox. There is also an alternate simple form of a mailbox where the address specification appears alone, without the recipient's name or the angle brackets.

The originator address header fields of a message consist of the from field, the sender field (when applicable), and optionally the reply-to field. The originator fields indicate the mailbox(es) of the source of the message. The from field, which consists of the field name "From" and a comma-separated list of one or more mailbox specifications, specifies the author(s) of the message, that is, the mailbox(es) of the person(s) or system(s) responsible for the writing of the message. If the from field contains more than one mailbox specification in the mailbox-list, then the sender field must appear in the message. The sender field, which contains the field name "Sender" and a single mailbox specification, specifies the mailbox of the agent responsible for the actual transmission of the message. For example, if a secretary were to send a message for another person, the mailbox of the secretary would appear in the "Sender:" field and the mailbox of the actual author would appear in the "From:" field. The optional reply-to field may also be included, which contains the field name "Reply-To" and a comma-separated list of one or more addresses. When the "Reply-To:" field is present, it indicates the mailbox(es) to which the author of the message suggests that replies be sent. In the absence of the "Reply-To:" field, replies are typically by default sent to the mailbox(es) specified in the "From:" field unless otherwise specified by the person composing the reply.

The destination address headers fields of a message consist of three possible fields, each of the same form: the field name, which is either "To", "Cc", or "Bcc", followed by a comma-separated list of one or more addresses (specified using either mailbox or group syntax). The destination fields specify the recipients of the message. Each destination field may have one or more addresses, and each of the addresses indicate the intended recipients of the message. The only difference between the three fields is how each is used. The "To:" field contains the address(es) of the primary recipient(s) of the message. The "Cc:" field (where the "Cc" means "Carbon Copy" in the sense of making a copy on a typewriter using carbon paper) contains the addresses of others who are to receive the message, though the content of the message may not be directed at them. The "Bcc:" field (where the "Bcc" means "Blind Carbon Copy") contains addresses of recipients of the message whose addresses are not to be revealed to other recipients of the message.

When a message is a reply to another message, the mailboxes of the authors of the original message (the mailboxes in the "From:" field) or mailboxes specified in the "Reply-To:" field (if it exists) may appear in the "To:" field of the reply since these would normally be the primary recipients of the reply. If a reply is sent to a message that has multiple destination fields, it is often desirable to send a copy of the reply to all of the recipients of the message, in addition to the author. When such a reply is formed, addresses in the "To:" and "Cc:" fields of the original message will generally appear in the "Cc:" field of the reply, since these are normally secondary recipients of the reply. If a "Bcc:" field is present in the original message, addresses in that field may appear in the "Bcc:" field of the reply, but typically do not (and should not) appear in the "To:" or "Cc:" fields.

An active email user sends and receives a number of messages in any given day. Some messages that are received are junk mail that can be discarded unread, some are urgent alerts to be dealt with immediately, and other messages are pushed aside until the user has spare time available to read them. When an email user opens a received message using an email client application, most email client programs will display, in addition to the body of the message, the 'From:', 'To:', 'Cc:', 'Subject:', and 'Date:' header fields. A user can utilize the information provided in the displayed header fields to aid in deciding how the deal with the message. For example, a user that receives a large number messages might use the header fields displayed by his or her email client application in making a decision to closely read only the email messages where their mailbox address is listed in the 'To:' field based on an inference that messages where their address is instead listed in the 'Cc:' field are probably messages sent to that user simply to keep that user "in the loop," and therefore not of great importance to that user.

Nevertheless, in many cases, an email message sent to multiple recipients may contain, in the body of the message, a specific question directed to a recipient user whose address is listed in the "Cc:" field. If that recipient user decides to not read the message closely because his or her address is listed in the 'Cc:' field, there is a risk the specific inquiry directed to that user will go unanswered. This type of risk can increase in the cases of replies to messages that have multiple recipients and/or multiple destination fields are sent to all of the recipients of the message, in addition to the original message author. As described above, when such a reply is formed, addresses in the "To:" and "Cc:" fields of the original message will generally appear in the "Cc:" field of the reply, while the addresses in the "From:" field or addresses specified in the "Reply-To:" field (if it exists) will appear in the "To:" field of the reply. Particularly in areas of ongoing threaded group email discussion with many replies to the same original message, this destination field rearrangement can render the particular destination field where a recipient user's address appears meaningless as far as making a determination as to the message's particular importance to him or her.

SUMMARY OF THE INVENTION

The shortcomings of the prior art can be overcome and additional advantages can be provided through exemplary embodiments of the present invention that are related to a method for flagging email messages sent to an email user containing inquiries directed to the email user, the method comprising defining a natural language model for a set of inquiring phrasal forms in a first data store; defining a list of terms used to identify a first user having an email address managed by an email host system in a second data store; accessing the email host system to retrieve an email message sent to the email address; parsing a textual content of a message body of the email message to generate one or more natural language tokens each corresponding to a text string in the message body; accessing the first data store to identify each of the one or more natural language tokens that matches with an inquiring phrasal form in the set of inquiring phrasal forms; accessing the second data store to determine if any of the text strings in the message body corresponding to the one or more natural language tokens that match with an inquiring phrasal form in the set of inquiring phrasal forms includes a term from the list of terms; and flagging the email message if any of the text strings in the message body corresponding to the one or more natural language tokens that match with an inquiring phrasal form in the set of inquiring phrasal forms includes a term from the list of terms.

The shortcomings of the prior art can also be overcome and additional advantages can also be provided through exemplary embodiments of the present invention that are related to computer program products and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to provide an inquiry detection system for processing incoming email messages retrieved by an email client application being operated by a user to detect the presence of inquiries made by the authors of the incoming messages within the bodies of the messages that are specifically intended to be answered by the user, and, upon detecting such an inquiry in an email message, provide an indication of the pertinence of that message to the user when the user opens the message using the email client application. In exemplary embodiments, this indication can be provided by ensuring that the email address of the user to whom the inquiry within the body of the message is directed appears in the "To:" field of the message when the user opens the message through the email client application.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
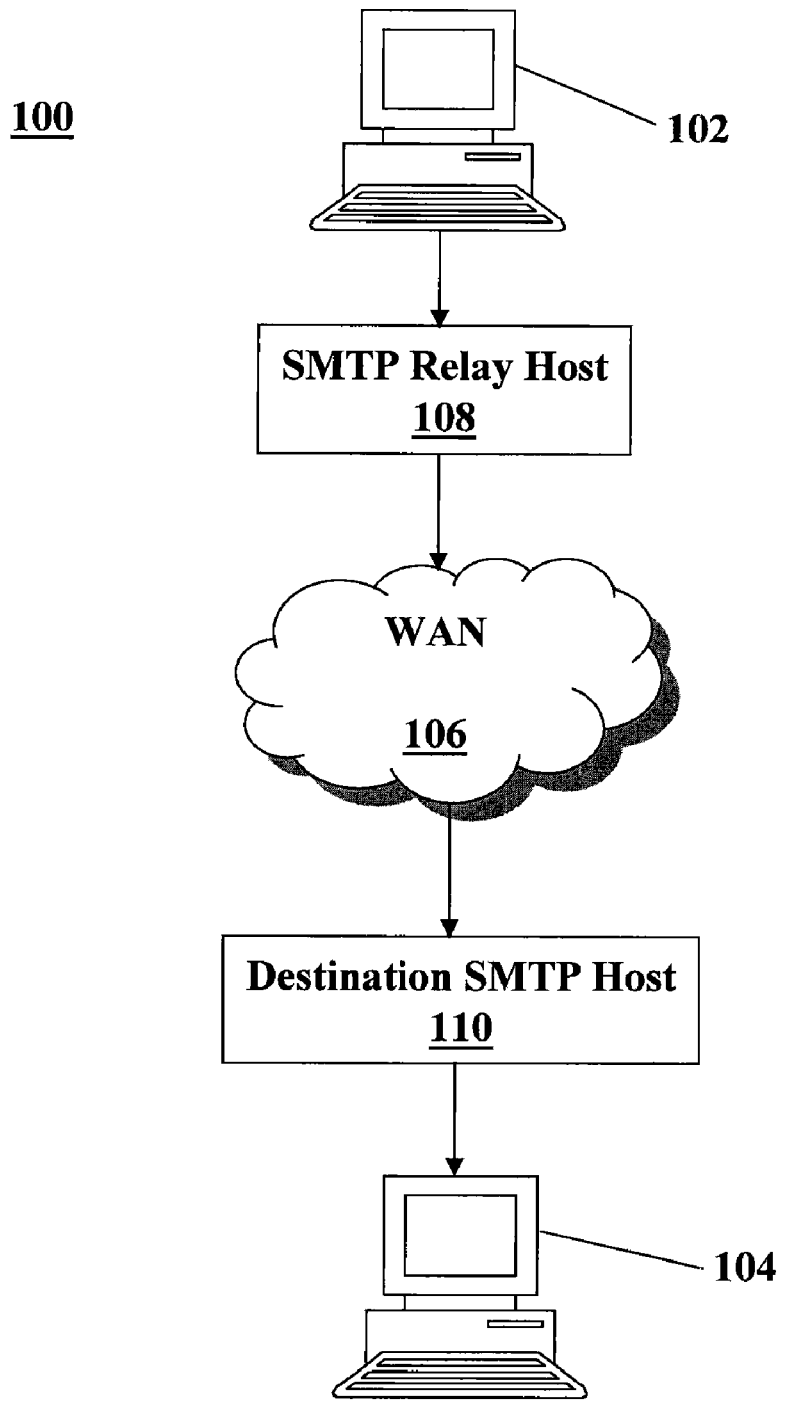
FIG. 1 is a block diagram illustrating an exemplary embodiment of a general process of receiving an incoming email message.

Referring now to FIG. 1, a block diagram illustrating an exemplary embodiment of a process of receiving an incoming email message is provided. FIG. 1 includes sender client computer system 102 and recipient client computer system 104, operated by respective sender and recipient users, and shows the path or flow of an incoming email message. To initiate the message flow, a sender user accesses an email client application using sender client system 102 to compose and send an email message that travels through a wide area network (WAN) 106 (for example, the Internet) and is retrieved by an email client application accessed by recipient client system 104.

In the present exemplary embodiment, the email message is delivered according to the Simple Mail Transfer Protocol (SMTP) specifications as defined in RFC 2821, published by the Internet Society in April 2001 (and available on the Internet at http://www.ietf.org/rfc/rfc2821.txt). This document is herein incorporated by reference. Initially, the message is accepted for delivery at a SMTP relay host 108 that is used by the sender's email client application (usually the delivery agent software on the machine running or in the same organization as the sender's email client application). SMTP relay host 108 then establishes a TCP connection over WAN 106 to a destination SMTP host 110 that can be accessed by the recipient's email client application or mail user agent. SMTP relay host 108 then transmits the message over WAN 106 to the recipient's mailbox, as defined by the recipient's email address, on destination SMTP host 110. The message is then stored on destination SMTP host 110 until retrieved by the recipient's email client application (for example, the next time the recipient checks for new email at the destination SMTP host using recipient client computer 104). More specifically, when the recipient user logs into SMTP host 110 through the recipient's email client application, the email client application assumes the email address registered for the logged-in recipient user. The email client application then communicates with SMTP host 110 to receive all email messages sent to that particular email address using, for example, the Post Office Protocol (POP) or the Internet Message Access Protocol (IMAP). Once retrieved through any suitable email client application, the email message can be viewed at recipient client system 104. The recipient user may also send email messages from that email address to other email addresses via the email client application.

Each client system 102, 104 is a user terminal or other client system or device implementing software for and running a respective email client application. Email client applications may also be referred to as email applications or simply clients and may be implemented in a variety of ways. In exemplary embodiments, the sender and the recipient of an email message, including the users of client systems 102, 104 in FIG. 1, can each utilize a myriad of email client applications, which range from proprietary email client applications (thick clients) to web-based interfaces that send and retrieve email messages in which the user agent function is provided by a Web server and/or a back-end program (for example, a CGI program) running on the same system as the destination SMTP host. Examples of email client applications include Microsoft Outlook, IBM's Lotus Notes, Netscape Communicator (or Netscape 8.0), and the AOL 9.0 interactive service software (which includes the email function). Other examples of email client applications include Mozilla thunderbird, and web-mail clients such as gmail, hotmail, and the like.

In exemplary embodiments, the computer systems of client computers 102 and 104 can be one or more Personal Computers (PCs) (for example, IBM or compatible PC workstations running the Microsoft Windows operating system or Linux OS, Macintosh computers running the Mac OS operating system, or equivalent), Personal Digital Assistants (PDAs), hand held computers, palm top computers, smart phones, game consoles, or any other suitable information processing devices. In other exemplary embodiments, the computer systems of one or more of client computers 102, 104 and mail hosts 108, 110 can be a server system (for example, SUN Ultra workstations running the SunOS operating system, IBM RS/6000 workstations and servers running the AIX operating system, or an IBM zSeries eServer running z/OS, z/VM or Linux OS). An exemplary computer system for client computers 102 and 104 is described in greater detail below with reference to FIG. 4.

In exemplary embodiments, WAN 106 can be a circuit switched network, such as the Public Service Telephone Network (PSTN), a packet switched network (which can be a wide area network (WAN), such as the global Internet, a private WAN, a telecommunications network or any combination of the above-mentioned networks), a wired network, a wireless network, a broadcast network, or a point-to-point network.

Exemplary embodiments of the present invention can be implemented to provide an inquiry detection system for processing incoming email messages retrieved by an email client application being operated by a user to detect the presence of inquiries made by the authors of the incoming messages within the bodies of the messages that are specifically intended to be answered by the user, and, upon detecting such an inquiry in an email message, provide an indication of the pertinence of that message to the user when the user opens the message using the email client application. In exemplary embodiments, this indication can be provided by ensuring that the email address of the user to whom the inquiry within the body of the message is directed appears in the "To:" field of the message when the user opens the message through the email client application. For example, where the user's email address was specified in the "Cc:" field or the "Bcc:" field when the message with an inquiry directed to that user was sent by the author, the recipient detection system can be configured, upon recognizing this inquiry, to edit the header of the email message so that the email address of the user being inquired appears in the "To:" field when the user opens the message through his or her email client application, and thereby, the user can make an inference that he or she is a primary recipient of the message and that the information conveyed in the message is intended to be read by him or her. Because this edit to the header fields of the email message would not take place until after the message has been delivered, exemplary embodiments can be implemented so that the integrity of email messages sent over the Internet (or other similar public or private network or internetwork) between and amongst the senders and recipients of email messages is fully maintained.

In exemplary embodiments, the inquiry detection system can be implemented to utilize natural language processing (NLP) to analyze the bodies of incoming email messages retrieved by an email client application for direct inquiries made by the authors of the email messages to the user of the email client application. In various aspects, the inquiry detection system scans the content of each incoming email message for text strings corresponding to natural language phrasal forms that indicate that the message's author might have included an inquiry in the body of the message that is intended to be specifically answered by the user of the retrieving email client application. The text string may be a keyword, a sentence, or a sequence of a fixed number of words. A phrasal form is a generic word or a generic group of words that functions as a single unit in the syntax of a sentence. If the inquiry detection system determines that the message's author may have included an inquiry in the body of the message that is intended to be specifically answered by the user of the retrieving email client application, the inquiry detection system can provide an indication of the inquiry to the user when the user opens the message using the email client application.

In exemplary embodiments, the inquiry detection system can be implemented to first examine the textual content of the body of an incoming email message retrieved by an email client application for text strings matching with a phrasal form in a predefined "inquiring-language" list of phrasal forms that indicates a question being asked by the message's author. The inquiring-language list is provided using a natural language model that associates each phrasal form in the list with one or more particular strings of inquiring language (for example, the natural language model can be implemented with phrasal forms that include question words such as 'where', 'what', 'when', 'why', 'how', 'whom', etc.). When such a match is detected for an "inquiring" phrasal form, the inquiry detection system can be implemented to further examine the matched text string to determine if the text string suggests that the indicated inquiry is specifically intended to be answered by the user of the retrieving email client application. In particular, the inquiry detection system can be implemented to search for a reference in the text string to the user of the retrieving email client application. For example, if the particular recipient user's name is Corey Johnson, the inquiry detection system may be implemented to parse the matched text string for occurrences of any of the terms 'Corey', 'Johnson', 'CJ', and any other terms used to specifically address the recipient user. The inquiry detection system can be implemented to maintain a list of terms used to address the recipient user.

In exemplary embodiments, the inquiring-language list of phrasal forms and the list of terms used to address the recipient user can be preprogrammed within the inquiry detection system and/or the inquiry detection system can be configured to provide functionality through which the user can define, remove, or otherwise modify the phrasal forms in the natural language model and/or the list of terms used to address the recipient user. In exemplary embodiments, the inquiry detection system can be configured to adapt to the writing patterns of the authors of messages sent to the user through incremental learning to dynamically define, remove, or otherwise modify the phrasal forms and their associations in the natural language model (for example, based upon nicknames for the user that are frequently used in email correspondence to address the user).

If the inquiry detection system determines that the textual content of the body of an incoming email message indicates a question being asked by the message's author and locates a reference in the text string to the user of the retrieving email client application, the inquiry detection system can provide an indication of the inquiry to the user when the user opens the message using the email client application. In exemplary embodiments, the determination can be made by the inquiry detection system automatically upon locating a text string in the body of an incoming email message for the user that matches a phrasal form in the inquiring-language list of phrasal forms and then further locating a term from the list of terms used to address the recipient user within the matching text string. Alternatively, the inquiry detection system can be implemented to make the determination based on a statistical natural language model to reduce the probability of false detections (that is, the probability that the recipient inquiry detection spuriously detects a text string as indicative of a question directed to the user). The inquiry detection system can utilize the statistical natural language model to determine a probability that a matched text string suggests a question directed to the user as a function of stored probability values for a plurality of text strings and a location of a term addressing the user within the text string. For convenience, unless otherwise noted, a "probability value" can refer herein to a statistical probability, a log-probability, a probability distribution, or other function relating to the likelihood that a particular text string suggests a question directed to the user.

In exemplary embodiments, aspects of the inquiry detection system may be implemented as an aspect of a software package for an email client application, or as one or more program modules implemented for incorporation with a an email client application as, for example, one or more libraries of functions, one or more plug-in or extension modules, one or more dynamic link-libraries, etc. In exemplary embodiments, aspects of the inquiry detection system may operate as a separate application program (for example, as a background agent module) or as part of the kernel or shell of an operating system. Aspects of the inquiry detection system can be installed on a computer system separately or in combination through a network-download, through a computer-readable medium such as an optical or magnetic disc, or through other software transfer methods. Aspects of the inquiry detection system may also be offered as a service from a service provider. In general, the inquiry detection system is specific to the natural language in which it was developed (for example, English or French). An email client application may include a plurality of inquiry detection systems, each for a different natural language.

Figure 2:
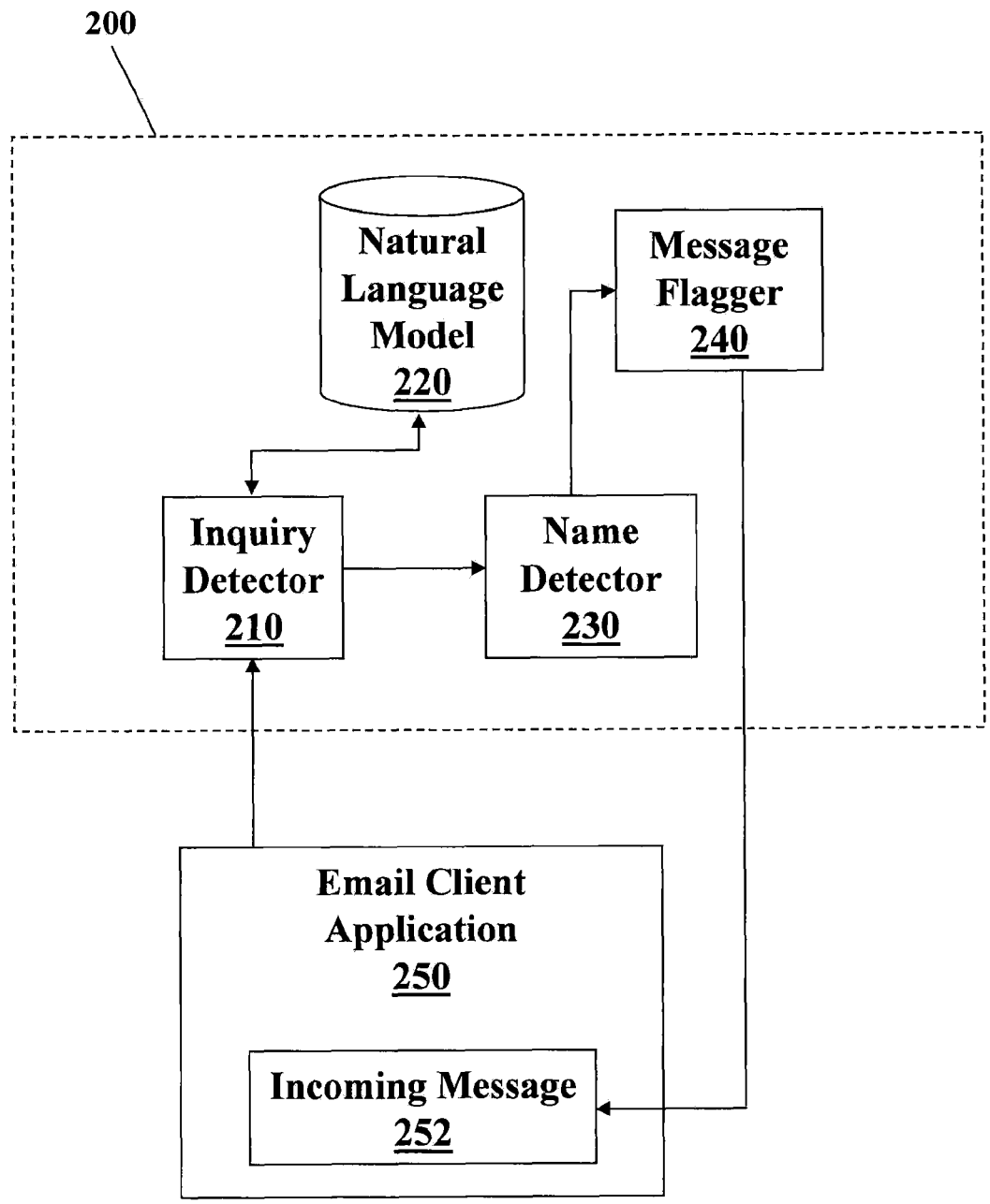
FIG. 2 is a block diagram illustrating an exemplary embodiment of an inquiry detection system in accordance with the present invention.

Referring now to FIG. 2, an exemplary embodiment of an inquiry detection system 200 in accordance with the present invention is illustrated. Inquiry detection system 200 can include one or more program modules and data storage units. As used herein, the term "program modules" includes routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of the machine embodying inquiry detection system 200. Aspects of the modules may be written in a variety of programming languages, such as C, C++, Java, etc. The functionality provided by the modules shown in FIG. 2 can be combined and/or further partitioned. The modules and/or storage units can all be implemented and run on the same computing system (for example, the exemplary computer system illustrated in FIG. 4 and described below) or can be implemented and run on different computing systems. For example, one or modules can be implemented on a personal computer operated by a user while other modules can be implemented on a remote server and accessed via a network.

In the present exemplary embodiments, inquiry detection system 200 is described as being implemented and running on a single computer system. Inquiry detection system 200 may be implemented, for example, as a plug-in for an email client application 250 stored in memory on the computer system. Email client application 250 contains computer program instructions that can be executed to allow a user of the computer system to log into an email host system. The email client application then assumes the email address registered for the logged-in user and can communicate with the host system to receive all email messages sent to that particular email address. After retrieving an incoming email message, email client application 250 can present the email message for viewing at the computer system being operated by the user. The recipient user may also send email messages from that email address to other email addresses via email client application 250.

In the present exemplary embodiment, inquiry detection system 200 includes an inquiry detection module 210, a natural language model 220, a name detection module 230, and a message flag module 240. Inquiry detection module 210 includes instructions for detecting the language used in an incoming email message 252 retrieved by email client application 250 and addressed to the user of the email client application. Natural language model 220 is implemented to store a predefined "inquiring-language" list of natural language phrasal forms corresponding to text strings that indicate that the message's author might have included an inquiry in the body of the message. Natural language model 220 can comprise any suitable data repository for storing, managing, and retrieving data, and which may be implemented using any suitable database technology, such as relational or object-oriented database technology. The phrasal forms maintained by natural language model 220 may be retrieved by a processor for use by inquiry detection module 210 in determining whether the author of incoming email message 252 might have included an inquiry in the body of the message. Name detection module 230 includes instructions for detecting whether a text string that has been determined to be a likely inquiry by inquiry detection module 210 contains a reference to the user of the retrieving email client application. Message flag module 240 includes instructions for providing a mechanism to indicate the existence of a likely inquiry by the author of incoming email message 252 that contains a reference to the user of email client application 250 (as determined by inquiry detection module 210 and name detection module 230) when the user open the message using the email client application.

Inquiry detection module 210 is configured to find and mark text sequences in the body of incoming email message 252 that indicates a question being asked by the message's author by identifying and isolating such text sequences using syntactic, formatting, contextual, semantic, or document markup information. Inquiry detection module 210 is operatively coupled to email client application 250 and receives application data from the email client application as input in the form of a stream of the textual content of incoming email message 252. As it receives the stream of textual content, inquiry detection module 210 parses the textual content using lexical analysis to create natural language tokens from the sequences. Essentially, these processing techniques can identify the human language words in the sentence as a sequence of individual tokens suitable for further processing. Each token identified by the lexical analysis mechanism contains information that identifies what the entity is and where it is located in the document. The tokenized words may also be lemmatized, that is, reduced to a root word, or otherwise structured into a context-free approximation of the grammar, by the lexical analysis mechanism. The lexical analysis performed may also ignore and not include certain common, general words (such as 'a' or 'the') in tokens. Infrequent words and other encountered character strings, such as numbers, may be tokenized as an undefined string. Other natural language processing techniques are also contemplated, and the lexical analysis mechanism can rely on any suitable linguistic parsing formalism such as head-driven phrase structure grammar parsing, shallow parsing, and dependency grammar parsing.

After generating the natural language tokens, inquiry detection module 210 makes a determination of whether any of the natural language tokens indicate a question being asked in the body of incoming email message 252 by the author of the message. To make this determination, inquiry detection module 210 accesses natural language model 220, which stores a corpus of phrasal forms corresponding to question words and associated text sequences that are commonly used when making an inquiry to a message recipient. For example, the corpus maintained by natural language model 220 could include phrasal forms that correspond to sentences that end in a question mark, phrasal forms that correspond to text sequences that include question words such as 'where', 'what', 'when', 'why', 'how', 'whom', etc., and phrasal forms that correspond to a person's name followed by a colon (for example, '\*\*\*:', where \*\*\* corresponds to any name. More specifically, inquiry detection module 210 queries natural language model 220 with each natural language token extracted from the document for matches with the vocabulary of phrasal forms stored in the natural language model.

If inquiry detection module 210 determines that a natural language token created from the textual content of the body of incoming email message 252 indicates a question being asked by the author of the message, the string of text in the incoming email message body that corresponds to that natural language token is passed to name detection module 230. Name detection module 230 then examines the matched text string to determine if the text string suggests that the indicated inquiry is specifically intended to be answered by the user of email client application 250. In exemplary embodiments, name detection module 230 can be implemented to make this determination by searching for a reference in the matching text string directly addressing the user of email client application 250. To make such a determination, name detection module 230 can be implemented to maintain a list of terms used to address the recipient user (for example, names, nicknames, identification codes, etc.).

If name detection module 230 determines that a text string in the body of incoming email message 252 that corresponds to a natural language token indicating an inquiry being made by the author of the message suggests that the indicated inquiry is specifically intended to be answered by the user of email client application 250, an indication of such is sent to message flag module 240, which then proceeds to access the email client application to flag incoming email message 252 as a message containing textual content that suggests an inquiry being made of the recipient user of the email client application by the message's author. Message flag module 240 is further implemented to provide a mechanism that indicates the existence of such a suggested inquiry) when the user open incoming email message 252 using email client application 250.

In exemplary embodiments, name detection module 230 can be configured to provide this indication by implementing a mechanism that ensures that the email address of the user being inquired by the content of the message appears in the "To:" field of the message when the user opens the flagged message through the email client application. For example, where the user's email address was specified in the "Cc:" field or the "Bcc:" field in incoming email message 252, name detection module 230 can be configured to edit the header fields of the email message so that the email address of the user of email client application 250 appears in the "To:" field when the user opens the message through the email client application. In such a case, name detection module can also be configured to delete the email address of the user from the "Cc:" field or the "Bcc:" field to avoid redundancy. In another example, where the user's email address was included in an electronic mailing list (that is, an "alias" email address that will result copies of the messages that are sent to this address being resent to all email addresses in a list of recipients on the mailing list when the mailing list is resolved or transformed into the recipient list by an automatic messaging agent) that was specified in the "To:" field in incoming email message 252, name detection module 230 can be configured to edit the "To:" field of the message to explicitly specify the email address of the user of email client application 250 when the user opens the message through the email client application. In both examples, the editing of the header fields performed by name detection module 230 enables the user of email client application 250 to make an inference that he or she is a primary recipient of incoming email message 252 and that the information conveyed in the message is intended to be read by him or her. In exemplary embodiments, to further enable this inference, name detection module 230 can be configured to edit the header fields of the email message so that the email address of the user of email client application 250 appears as the first address listed in the "To:" field when the user opens the message through the email client application.

In exemplary embodiments in which inquiry detection system 200 implements a mechanism that ensures that the email address of the user being inquired by the content of the message appears in the "To:" field of the message when the user opens the flagged message through the email client application, the inquiry detection system can be configured to initially examine the destination address header fields of the message to determine if the email address of that user had been originally specified in the "To:" field by the author of the message. As a result, in a situation where the email address of the user was originally specified in the "To:" field by the author of the incoming email message, inquiry detection system 200 can be configured to forgo the examination of the message for determining whether there is an inquiry directed to the user. In an alternative exemplary embodiment, the inquiry detection system can be configured to initially examine the destination address header fields of the message to determine if the email address of that user had been originally specified as the first email address listed in the "To:" field by the author of the message. As a result, in a situation where the email address of the user was originally specified as the first email address listed in the "To:" field by the author of the incoming email message, inquiry detection system 200 can be configured to forgo the examination of the message for determining whether there is an inquiry directed to the user. Otherwise, inquiry detection system 200 can be configured to perform the examination and, where the incoming email address is determined to have an indication of inquiry directed to the user of email client application 250, inquiry detection system can be configured to edit the destination address header fields of the email message so that the email address of the user appears as the first address listed in the "To:" field when the user opens the message through the email client application.

In exemplary embodiments, the vocabulary of phrasal forms corresponding to question words and associated text sequences that are commonly used when making an inquiry to a message recipient stored in natural language model 220 can be developed using a training set of email messages providing a representative sample of typical expressions used to make an inquiry to a recipient of an email message. In exemplary embodiments, the vocabulary of phrasal forms can be installed within natural language model 220 using data packages such as, for example, natural language packages, that correspond to sets of typical expressions used to make an inquiry to a recipient of an email message. In exemplary embodiments, inquiry detection system 200 may also be implemented to provide a user interface element through which a user can create, delete, or otherwise modify phrasal forms stored in natural language model 220 and/or terms used to address the recipient user maintained by name detection module 230 using conventional interfacing techniques. In exemplary embodiments, inquiry detection system 200 can be implemented within email client application 250 to be an optional preference setting provided by the user interface of the email client application that may be activated and deactivated as desired by the user of the email client application.

Figure 3:
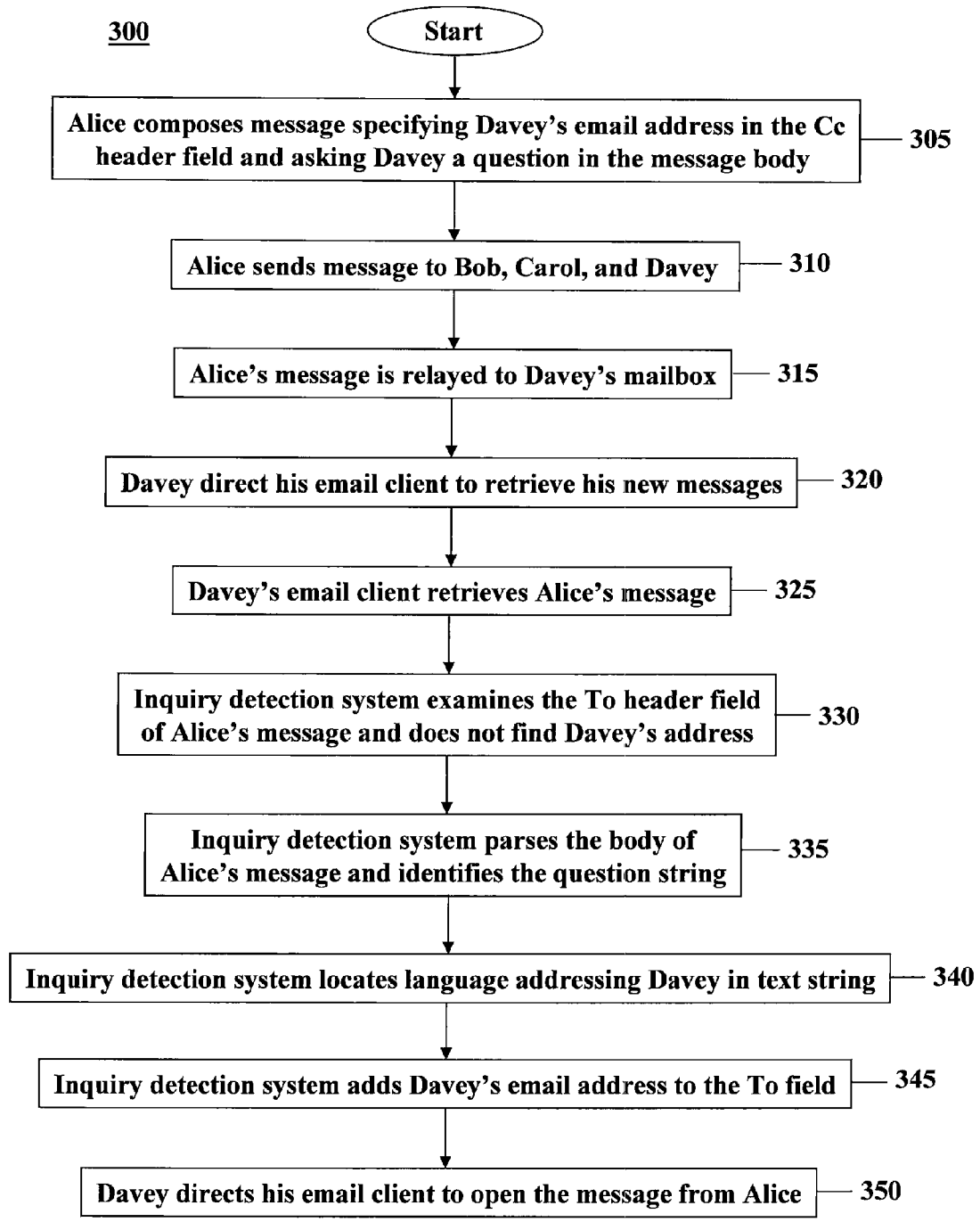
FIG. 3 is a flow diagram illustrating an example of a general sequence of sending an email message and handling receipt of the message within an email client application implementing an exemplary embodiment of the present invention.

Referring now to FIG. 3, a flow diagram is provided illustrating an example of a general sequence of an email exchange in which an email message is sent to a user having an email address that receives email messages at an electronic mailbox that is accessed using an email client application implementing an inquiry detection system in accordance with an exemplary embodiment of the present invention. It should be recognized that sequence illustrated in FIG. 3 is exemplary only, and that one skilled in the art would recognize various alternative scenarios that would be handled in different fashion by the inquiry detection system of the present exemplary embodiment and various modifications that may be made to the inquiry detection system of the present exemplary embodiment, all of which are considered as a part of the present invention.

Example sequence 300 begins at block 305, with message sender Alice accessing her email client application to compose an email message with the email addresses for message recipients Bob and Carol specified as recipients in the "To:" field of the message and the email address for message recipient Davey specified as a recipient in the "Cc:" field. While the "To:" field is typically used to designate the intended primary recipients of an email address, the message composed by Alice at block 305 includes an inquiry that is directed specifically to Davey. For example, the inquiry may take of the form of a text sequence such as "Hello Davey: . . . ", "Davey: What do . . . ?", "Davey: could you . . . ?", "Davey, what are your thoughts . . . ?", or "Let's ask Davey . . . ". At block 310, Alice directs her email client application to send the message to Bob, Carol, and Davey. At block 315, the email message is relayed over a network in a conventional fashion to the electronic mailbox for Davey's email address maintained by an email host system that is accessible by Davey's email client application, which implements an inquiry detection system in accordance with an exemplary embodiment of the present invention.

At block 320, Davey logs into the email host system through his email client application and directs the application to retrieve Davey's incoming email messages from the email host system for Davey's email address. At block 325, the email message composed by Alice at block 305 is retrieved by Davey's email client application. At block 330, the inquiry detection system implemented within Davey's email client application examines the destination address header fields of the email message sent from Alice. Upon recognizing that Davey's email address is not specified in the "To:" field of the message, the inquiry detection system, at block 335, parses the body of the email message to identify any text sequences indicating an inquiry being made by Alice. In the present example, upon identifying such an indication of an inquiry, the inquiry detection system, at block 340, examines the text sequence to determine if the text string suggests that the indicated inquiry is specifically intended to be answered by Davey. Upon identifying such a suggestion in the text sequence, the inquiry detection system, at block 340, edits the destination address header fields of the email message sent from Alice so that Davey's email address specified in the "To:" field. At block 345, Davey accesses his email client application to open and view the message sent from Alice. Upon seeing that his email address is specified in the "To:" field of the message, Davey determines that he should closely read the full content of the body of the message and, at block 350, Davey reads the inquiry from Alice that was specifically directed to be answered by him.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 4:
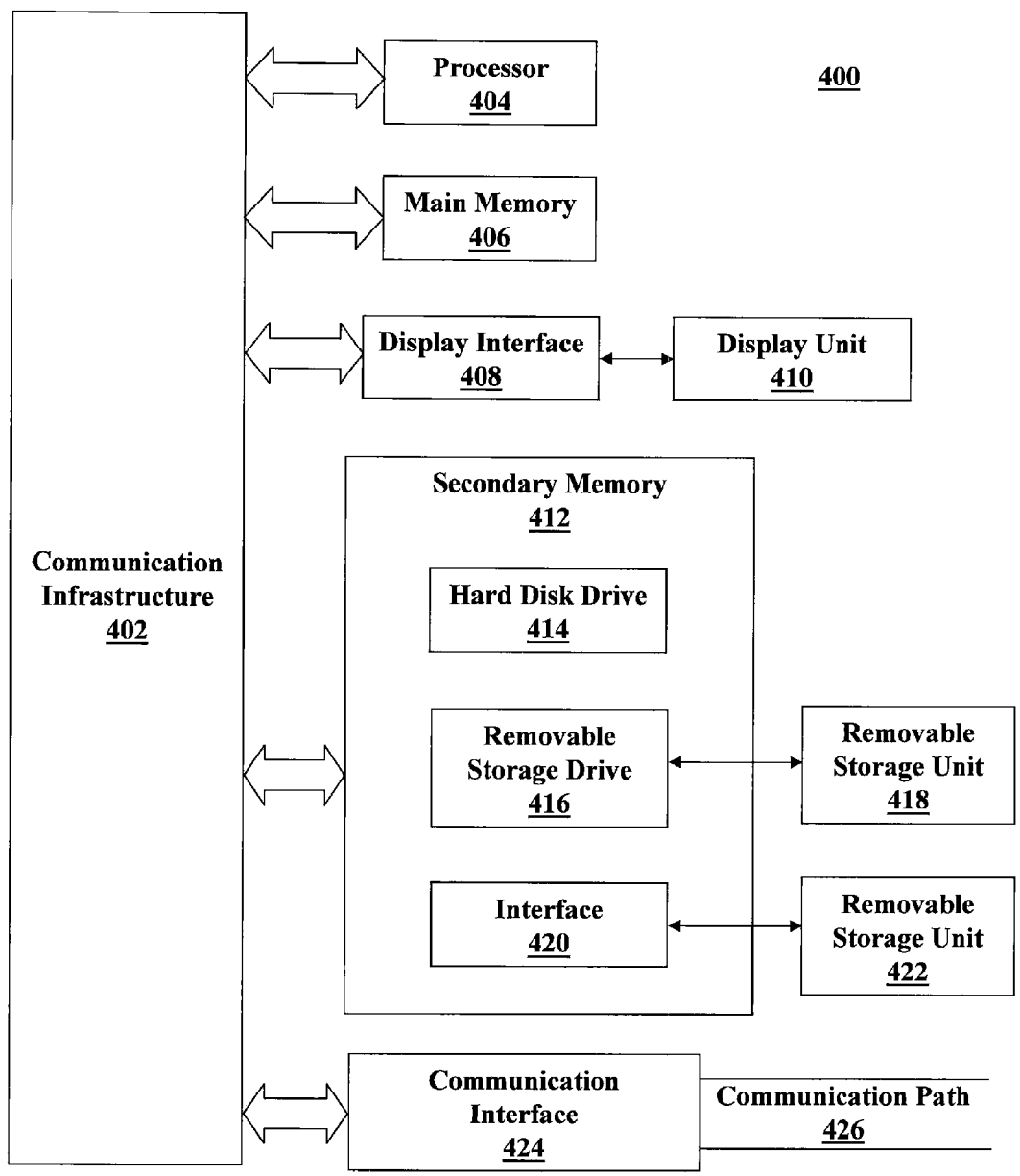
FIG. 4 is a block diagram illustrating an exemplary computer system that can be used for implementing exemplary embodiments of the present invention.

FIG. 4 is a block diagram of an exemplary computer system 400 that can be used for implementing exemplary embodiments of the present invention. Computer system 400 includes one or more processors, such as processor 404. Processor 404 is connected to a communication infrastructure 402 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 that forwards graphics, text, and other data from the communication infrastructure 402 (or from a frame buffer not shown) for display on a display unit 410. Computer system 400 also includes a main memory 406, which can be random access memory (RAM), and may also include a secondary memory 412. Secondary memory 412 may include, for example, a hard disk drive 414 and/or a removable storage drive 416, representing a floppy disk drive, a magnetic tape drive, an optical disk drive, etc. Removable storage drive 416 reads from and/or writes to a removable storage unit 418 in a manner well known to those having ordinary skill in the art. Removable storage unit 418, represents, for example, a floppy disk, magnetic tape, optical disk, etc. which is read by and written to by removable storage drive 416. As will be appreciated, removable storage unit 418 includes a computer usable storage medium having stored therein computer software and/or data.

In exemplary embodiments, secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (that is, channel) 426. Channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 406 and secondary memory 412, removable storage drive 416, a hard disk installed in hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 406 and/or secondary memory 412. Computer programs may also be received via communications interface 424. Such computer programs, when executed, can enable the computer system to perform the features of exemplary embodiments of the present invention as discussed herein. In particular, the computer programs, when executed, enable processor 404 to perform the features of computer system 400. Accordingly, such computer programs represent controllers of the computer system.

Although exemplary embodiments of the present invention have been described in detail, it should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for flagging email messages sent to an email user containing inquiries directed to the email user, the method comprising:
    defining a natural language model for a set of inquiring phrasal forms in a first data store;
    defining a list of terms used to identify a first user having an email address managed by an email host system in a second data store;
    accessing the email host system to retrieve an email message sent to the email address;
    parsing a textual content of a message body of the email message to generate one or more natural language tokens each corresponding to a text string in the message body;
    accessing the first data store to identify each of the one or more natural language tokens that matches with an inquiring phrasal form in the set of inquiring phrasal forms;
    accessing the second data store to determine if any of the text strings in the message body corresponding to the one or more natural language tokens that match with an inquiring phrasal form in the set of inquiring phrasal forms includes a term from the list of terms; and
    flagging the email message if any of the text strings in the message body corresponding to the one or more natural language tokens that match with an inquiring phrasal form in the set of inquiring phrasal forms includes a term from the list of terms, wherein flagging the email message comprises editing a "To" header field of the email message to include the email address of the first user if the email address for the first user is not specified in the "To" header field.

2. A method for flagging email messages sent to an email user containing inquiries directed to the email user, the method comprising:
    defining a natural language model for a set of inquiring phrasal forms in a first data store;
    defining a list of terms used to identify a first user having an email address managed by an email host system in a second data store;
    accessing the email host system to retrieve an email message sent to the email address;
    parsing a textual content of a message body of the email message to generate one or more natural language tokens each corresponding to a text string in the message body;
    accessing the first data store to identify each of the one or more natural language tokens that matches with an inquiring phrasal form in the set of inquiring phrasal forms;
    accessing the second data store to determine if any of the text strings in the message body corresponding to the one or more natural language tokens that match with an inquiring phrasal form in the set of inquiring phrasal forms includes a term from the list of terms; and
    flagging the email message if any of the text strings in the message body corresponding to the one or more natural language tokens that match with an inquiring phrasal form in the set of inquiring phrasal forms includes a term from the list of terms, wherein flagging the email message comprises editing a "To" header field of the email message to include the email address of the first user as a first specified email address if the email address for the first user is not specified in the "To" header field as a first specified email address.

3. The method of claim 1, wherein the email message is retrieved by a first email client application being operated by the first user, the first email client application being configured to access the email host system to retrieve email messages sent to the first user.

4. The method of claim 3, wherein the first email client application implements a user interface having a first selectable option, and wherein parsing the textual content of the message body of the email message to generate one or more natural language tokens each corresponding to a text string in the message body, accessing the first data store to identify each of the one or more natural language tokens that matches with an inquiring phrasal form in the set of inquiring phrasal forms, accessing the second data store to determine if any of the text strings in the message body corresponding to the one or more natural language tokens that match with an inquiring phrasal form in the set of inquiring phrasal forms includes a term from the list of terms, and flagging the email message if any of the text strings in the message body corresponding to the one or more natural language tokens that match with an inquiring phrasal form in the set of inquiring phrasal forms includes a term from the list of terms is performed by the first email client application when the first selectable option is selected is performed by the first email client application if the first selectable option is selected.

* * * * *